(12) United States Patent
Daniels

(10) Patent No.: US 6,820,822 B2
(45) Date of Patent: Nov. 23, 2004

(54) NO LEAK SEAL SYSTEM FOR IRRIGATION WHEEL-DRIVE GEARBOX

(76) Inventor: Jeffrey Daniels, 2476 Bolsouer, 454, Houston, TX (US) 77005

(*) Notice: Subject to any disclaimer, the term of this patent is extended or adjusted under 35 U.S.C. 154(b) by 0 days.

(21) Appl. No.: 10/207,341

(22) Filed: Jul. 29, 2002

(65) Prior Publication Data

US 2004/0016833 A1 Jan. 29, 2004

(51) Int. Cl.⁷ ................................................ B05B 3/00
(52) U.S. Cl. ............ 239/261; 239/263.1; 239/263.3; 239/264; 239/159; 239/722; 239/723; 239/726; 239/728; 239/735; 239/748
(58) Field of Search ................ 239/261, 263.1, 239/263.3, 264, 159, 160, 722, 723, 726, 728, 735, 737, 740, 741, 742, 748; 277/374, 379, 381, 384, 385, 391, 392, 393; 74/425

(56) References Cited

U.S. PATENT DOCUMENTS

| | | | | |
|---|---|---|---|---|
| 3,643,967 A | * | 2/1972 | Stahl | 277/405 |
| 4,693,425 A | * | 9/1987 | Meis et al. | 239/735 |
| 5,862,997 A | * | 1/1999 | Reinke | 239/728 |
| 6,007,069 A | | 12/1999 | Sadowski | 6/16 |
| 6,220,601 B1 | | 4/2001 | Keller et al. | 7/16 |
| 6,237,863 B1 | * | 5/2001 | Smith | 239/722 |
| 6,322,079 B1 | | 11/2001 | Mullaney, III | 7/16 |
| 6,398,223 B1 | | 6/2002 | Radosav | 7/16 |
| 2001/0009114 A1 | | 7/2001 | Laurandel | 7/16 |
| 2003/0066913 A1 | * | 4/2003 | Reinke et al. | 239/735 |

* cited by examiner

Primary Examiner—Robin O. Evans
(74) Attorney, Agent, or Firm—Jackson Walker L.L.P.; Mark A. Tidwell, Esq.

(57) ABSTRACT

A gearbox for a drive line irrigation system in which the input and output shafts of the gearbox are sealed with a compressed and sintered silicon and carbide face seal. The face seal is contained within the gearbox and compressed between a gearbox end cap and a shaft bearing, obviating the need for external loading by bellows or similar spring elements.

8 Claims, 3 Drawing Sheets

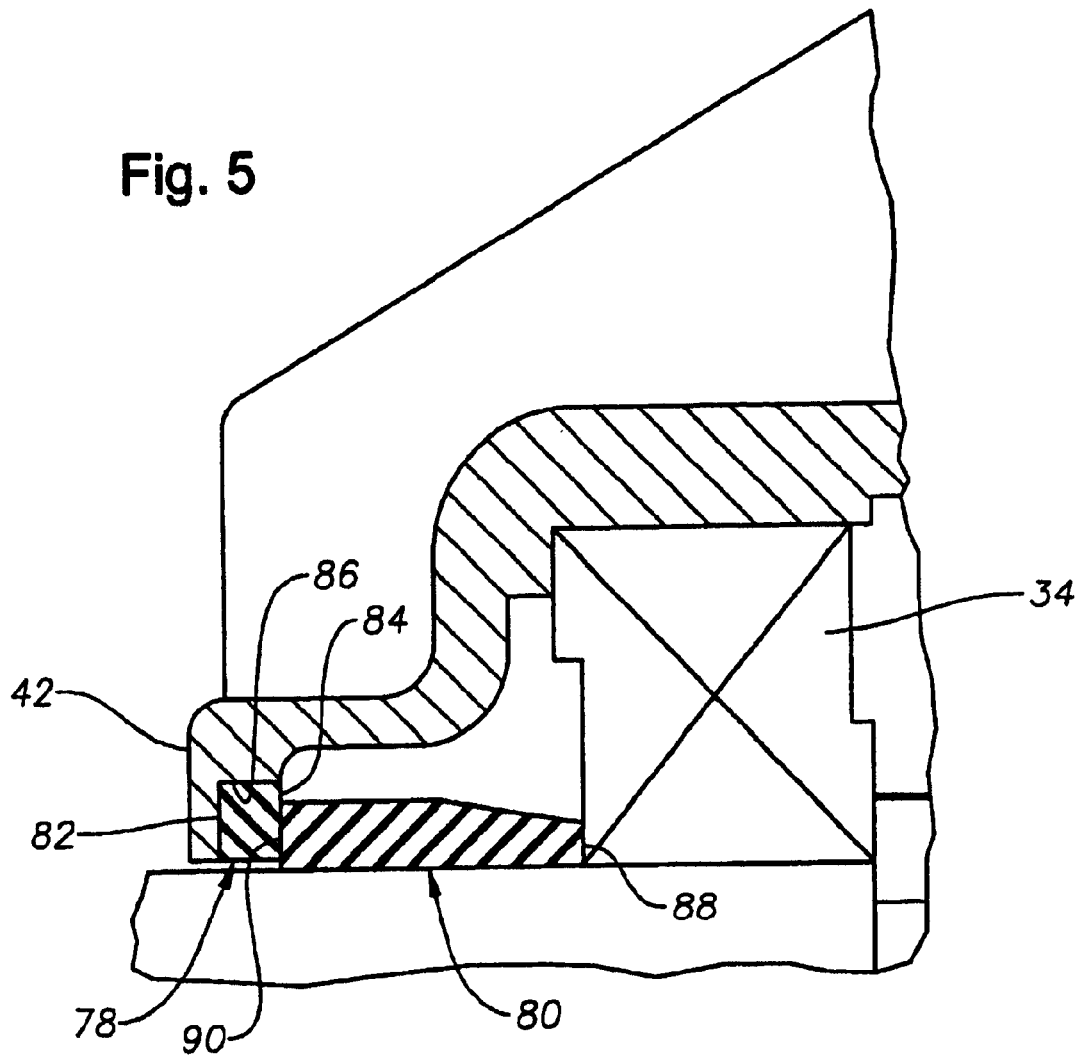

NO LEAK SEAL SYSTEM FOR IRRIGATION WHEEL-DRIVE GEARBOX

BACKGROUND OF THE INVENTION

1. Field of the Invention

This invention relates to the field of power transmission for use in mechanized irrigation equipment, and more particularly to the wheel drive gearboxes that drive the tires supporting and propelling the irrigation system.

2. Description of the Related Art

Center pivot and linear irrigation systems are utilized to irrigate large sections of land. Typically, such systems are capable of watering a quarter section of land, i.e., 160 acres, or more. A center pivot irrigation system is an approximately one-quarter mile mechanized pipe that rotates around a fixed pivot point. When activated, the irrigation pipe rotates around the pivot, emitting liquids over the area. The length of time required for a 360 degree rotation of the irrigation pipe typically range from 12 hours up to several days. Linear irrigation systems are comprised of similar irrigation structure, but move linearly across sections of land to be irrigated, typically by wire guidance.

In conventional irrigation systems, the irrigation pipe spans are 120 to 180 foot lengths supported by a wheeled tower at each intersecting span. Sprinklers are located at spaced intervals either along the length of the span or along a water conduit parallel to the span. The wheels of each tower are normally positioned perpendicular to the span such that the system moves laterally. When constructed, wheels tracks are established to follow a prescribed path, either circular for center pivot systems or linear for linear systems. Each tower is typically provided with one or more drive motors operable to move the tower. Generally, power from the motors is transferred to the wheels via a wheel drive gearbox connected to each wheel. Most conventional systems either utilize an electric gearmotor mechanically connected between the pair of wheel drive gearboxes, or hydraulic or electric motors directly coupled to the wheel drive gearboxes.

Agricultural wheel drive gearboxes are generally comprised of a gearbox housing in which is mounted a power input shaft having a worm gear defined thereon. A spur gear is axially attached to a power output shaft which is transversely mounted in the gearbox relative to the power input shaft such that the teeth of the spur gear engage the worm gear. A lubricant, such as heavy industrial grease or oil is disposed within the gearbox. Seals are provided at the points where the power shafts protrude from the gearbox. These prior art seals commonly consist of one or more o-rings or similar rubber sealing elements disposed around the shaft in sealing contact therewith. The standard operating pressure for such a seal is about 10–15 psi. Typically, these wheel drive gearboxes are not designed to withstand the full range of hazardous environmental conditions to which irrigation systems are likely to be exposed, such as moisture, dirt, insects and temperature extremes. Particularly vulnerable in these gearboxes are the oil seals located at the power shaft exit points. Such seals are utilized to maintain an oil bath for the internal gears and are therefore pressurized. As such, maintaining the integrity of the seal and the internal pressure within the gearboxes under the extreme working conditions of irrigation systems becomes crucial. These oil seals are most commonly lipped oil seals formed of nitrile rubber.

Generally, in order to maintain internal oil bath or lubricant pressure within the gearbox, lipped oil seals rely upon either a fixed polymer or nitrile lip having a face or contact surface compressed against the steel surface of a rotating shaft. Prior art irrigation drive line gearbox seals might also be mechanically compressed, i.e. loaded, to enhance sealing pressure by such means as a bellows or spring mechanism to urge the sealing elements into contact with one another. Without this "preloading", the gearbox will likely experience leakage at the seal face, especially as internal gearbox pressures rise. In this regard, prior art irrigation drive line gearboxes are likely to require an expansion chamber or vent plug to allow oil to completely submerge the worm gear while not pushing the seals out of the gearbox, i.e., creating excess pressure at the sealing interface. In another iteration of these prior art seals, an expanded gear housing is provided above the worm gear, thereby increasing the air cavity to allow some pressure compensation (thermal expansion) and preventing a blow-out of the seal. One drawback to the above-described nitrile rubber lip seals is that such seals fatigue much more quickly under the high internal pressures which may be generated in these types of gearboxes.

Specifically, these oil seals become wear points along the contact line between the lip face and the rotating metal drive shaft. Generally, all prior art polymer or nitrile seal lips harden and erode with age such that the intersecting metal surfaces are subject to environmentally induced corrosion and wear from the rotating seal. This creates particular vulnerability to the wheel drive gearboxes. As the seals wear, they eventually lose elasticity and sealing contact, resulting in a loss of internal gearbox pressure. Once internal pressure is lost, the gearbox lubricant leaks from the internal bearings and gears of the wheel drive, contaminating the internal gearbox environment, which may result in rapid total failure of the wheel drive gearbox.

As mentioned above, wheel drives exposed to agricultural environments are subject to many different hazards such as moisture, corrosive liquids including liquidized manure, the full range of soil and mineral conditions, insects and temperature extremes which could range from continental polar to equatorial. All of these hazards can damage the integrity of the irrigation system wheeldrives, and in particular, the lipped or cartridge oil seals used to maintain pressure within the gearbox. This is especially true for these types of prior art seals since their incorporation into a irrigation drive line gearbox leaves them at least partially exposed to the external environment.

More particularly as to these prior art wheel drive gearboxes, they are unable to maintain extreme case pressure arising from the varied operating environments without creating a gearcase vacuum pressure during cooling. These variances in case pressure are a contributing factor to premature failure in lipped and cartridge type seals. Further, the gearcase vacuum created when cooling may draw hygroscopic moisture into the gearcase, further contaminating the lubricant and resulting in accelerated gear and bearing wear.

Typically, irrigation systems are placed into service upon completion of construction and initial inspection. Thereafter, they are infrequently examined or maintained. As a result, when a wheel drive gearbox loses lubrication, it is unlikely to be detected. Loss of lubricant may result in seizure of the gears within the gearbox and when the gearbox has seized, the entire irrigation drive train and watering system may be subject to automated shutdown. One solution is to more frequently check and maintain the gear drives to the irrigation system. However, it is often difficult to determine when a seal will ultimately fail by visual inspection. Therefore increased inspection may not reasonably assure detection. Furthermore, in that such irrigation systems are otherwise automated and located in remote areas, such a solution is time consuming and expensive. In addition, since the system must be shut down to safely inspect the gear drive seals, there is a down time associated with such a procedure.

SUMMARY OF THE INVENTION

It is therefore an object of the invention to provide the means and apparatus to hermetically seal the gearcase from the environment.

It is also an object of the invention to maintain a high-pressure gear drive.

It is a further object of the invention to provide a gear drive that requires much less maintenance than prior gear drive.

It is a further object of the invention to provide a gear drive that is less likely to experience oil seal failure than prior art gear drives.

These and other objects are achieved through the wheel drive gearbox rotating oil seal system of the present invention in which the gearbox is hermetically sealed, such that the gearcase and components within can withstand the full range of extreme environmental and operating conditions without lubricant loss or failure during the stated design life. The rotating oil seal system provides a mechanical face seal comprised of compressed and sintered silicon and carbide elements whose surfaces create a sealing interface under a preloaded tension established during assembly. This ceramic-carbide face seal is functionally constructed within the gearbox housing, eliminating direct contact from solar radiation, especially ultraviolet radiation. The mechanical elements are made from inert silicates immune to metallic oxidation and wear. The preload of the sealing elements allow internal or external pressures to exceed 3 atmospheres without fatiguing or failing the components.

The above described invention is advantageous over the prior art because it is functionally impervious to environmental and application related failure modes, with the only wear surface being the interface between the silicon and carbide rotating elements, obviating the need for constant attention as is necessary with the prior art devices. In addition, the above described invention protects the gearbox's internal lubricant from a vacuum condition intake of hygroscopic moisture and other environmental hazards such as fertilizers, pesticides, fungicides, and liquidized effluent from the temperature extremes that could result in lubricant loss or failure. Further, the system can be easily retrofit the existing gear drives in the market.

BRIEF DESCRIPTION OF THE DRAWINGS

FIG. 5 is a blown-up, cut-away vie of the face seal.

DETAILED DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Although the protection system of the current will be described in relation to a center pivot irrigation system, those skilled in the art will understand that the invention is also applicable to gear drive gearboxes or other drive train or power transmission systems used with other irrigation system uses, one such non-limiting example being linear or lateral irrigation systems, or other oil field or industrial, or agricultural application.

Figure 1:
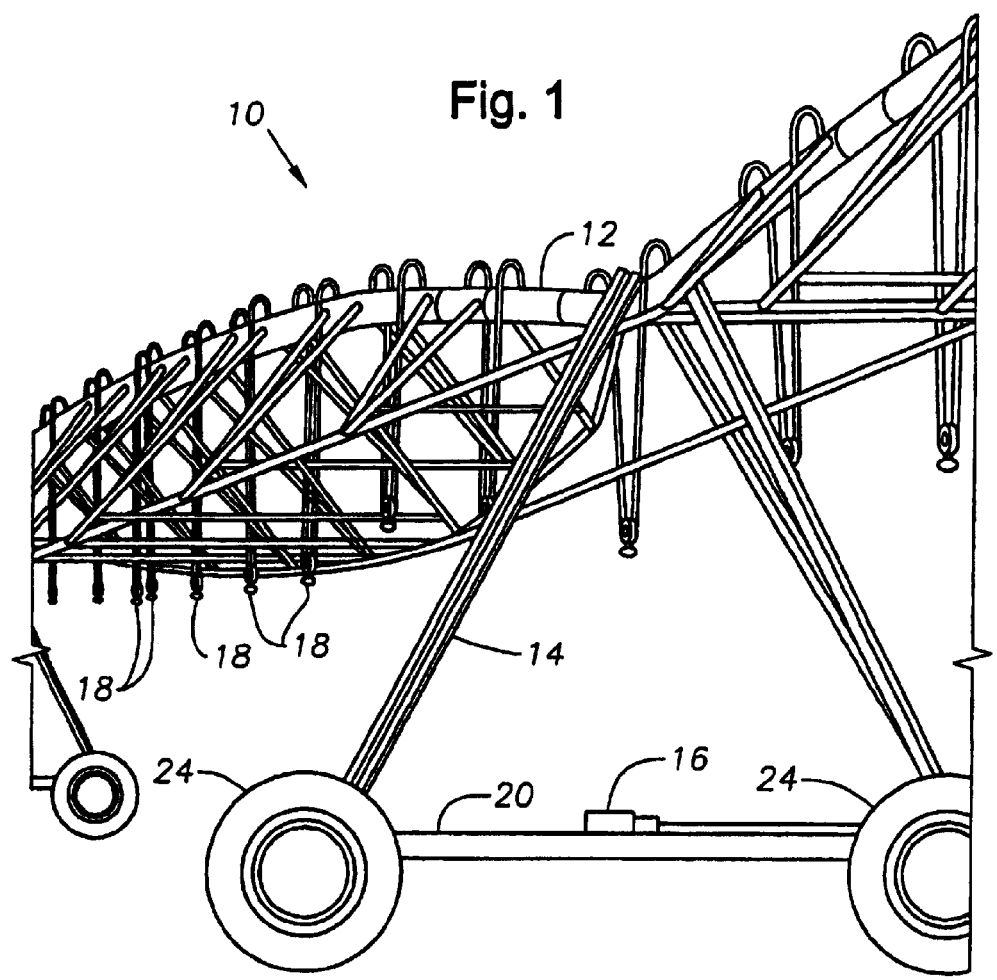
FIG. 1 is an elevation view of a center pivot irrigation span.

With reference to FIG. 1, a center pivot irrigation system 10 of the kind known in the art generally comprises an approximately one-quarter mile length of mechanized irrigation pipe 12 supported and propelled by motorized wheel towers 14 rotating on a center pivot point (not shown). Typically, the pipe spans are approximately 120 to 180 feet in length and utilize 6 to 10 inch diameter steel pipe irrigating waters or other fluids. Drive motors 16 are utilized to provide forward or reverse propel movement of the irrigation system. Attached to the pipe 12 are sprinkler or other liquid emitters 18.

Figure 2:
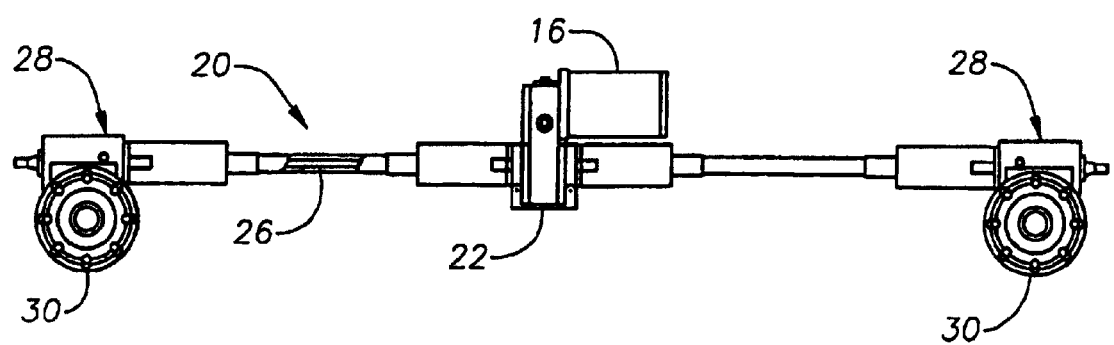
FIG. 2 is an elevation view of the invention installed on the tower of a center pivot irrigation span.

FIG. 2 more specifically illustrates the drive train 20 for each support tower. Specifically, the mechanized drive train 20, which is supported on tower chassis 14, includes an electric gearmotor 16 and primary gearbox 22 acting as the primary drive unit. Extending from primary gearbox 22 to each wheel 24 is a drive shaft 26. At wheel 24, drive shaft 26 attaches to a wheel drive gearbox 28 which powers wheel hub 30 on which is mounted wheel 24. Typically drive shaft 26 will be attached to wheel drive gearbox 28 via a universal joint or coupler (not shown).

Figure 3:
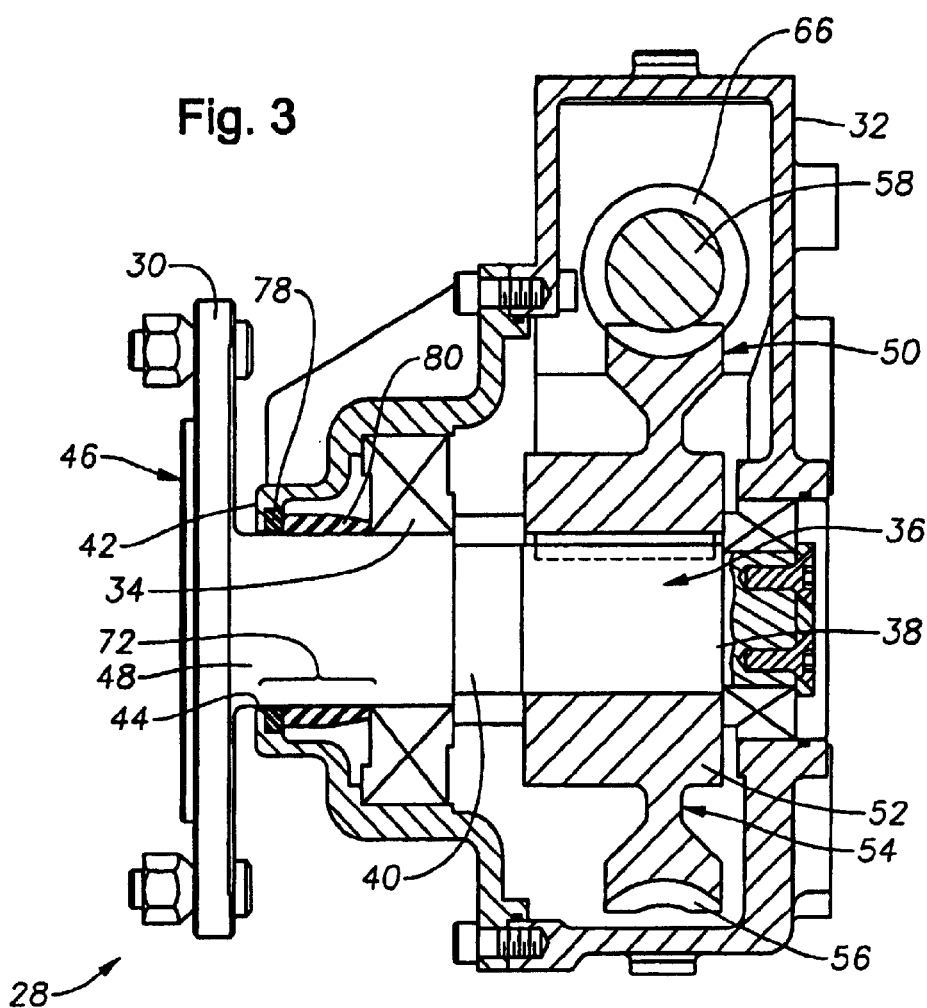
FIG. 3 is a first cut-away side view of the invention.
Figure 4:
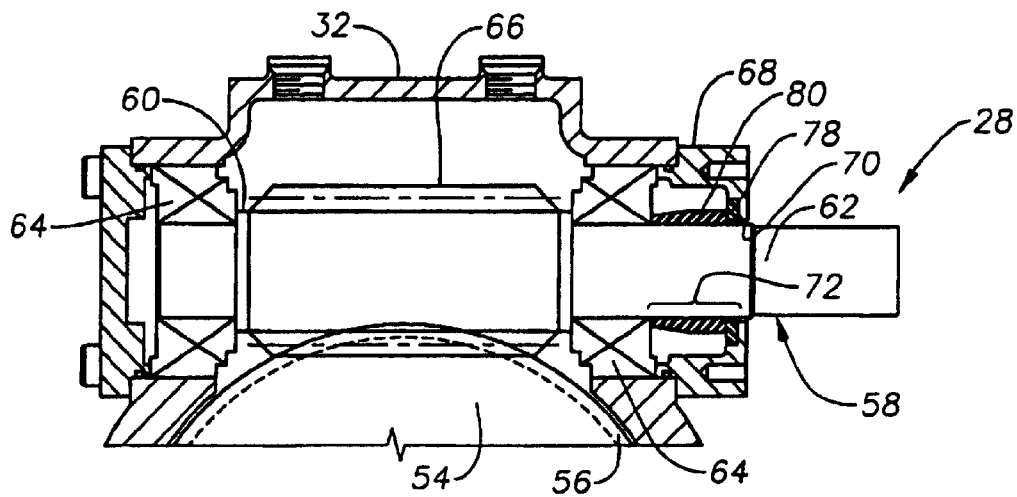
FIG. 4 is a second cut-away front view of the invention.

With reference to FIGS. 3 and 4, a wheel drive gearbox 28 of the present invention is shown. Gearbox 28 is formed of an outer housing 32 in which is mounted an output bearing 34 used to rotatingly secure an output shaft 36 within housing 32. Output shaft 36 includes a first end 38 and a second end 40, wherein said second end 40 extends from said outer housing 32 through a housing cap 42 having an output aperture 44 defined therein. Mounted on the second end 40 of output shaft 36 is an output spindle 46 comprising a tubular member 48 attached to said output shaft 36 and a wheel hub 30 concentrically attached to said tubular member 48. Adjacent the first end 38 of output shaft 36 is mounted worm gear 50. Worm gear 50 includes a cylindrical collar 52 around which is disposed a circular flange 54 having teeth 56 mounted around the periphery of the flange 54. Rotation of worm gear 50 results in rotation of output spindle 46 and wheel hub 30.

An input shaft 58 having a first end 60 and a second end 62 is also rotatingly mounted within housing 32. Input shaft 58 is supported within housing 32 by input bearings 64 and is provided with worm threads 66 along its length. The second end 62 of input shaft 58 extends from housing 32 through a housing cap 68 having an input aperture 70 therein, and is disposed for engagement by drive shaft 26 (FIG. 2). Input shaft 58 is mounted within housing 32 so that the axis of input shaft 58 is perpendicular to the axis of output shaft 36 and the worm threads 66 of input shaft 58 engage the teeth 56 of worm gear 50.

A ceramic face mechanical seal 72 is provided adjacent the input shaft 58 and output shaft 36 where each shaft extends from housing 32. Specifically, adjacent the output shaft 36, seal 72 is fitted within housing cap 42 and adjacent the input shaft 58, seal 72 is fitted within cap 68. Seal 72 is also mounted so that it is substantially flush with the adjacent bearing 34, 64, and in sealing contact with the shaft around which said seal 72 is mounted. As seen in the Figures, adjacent both output aperture 44 and input aperture 70, seal 72 is mounted within gearbox housing 32, and specifically cap 42, 68, thereby protecting seal 72 from the exterior environment. Those skilled in the art will understand that by mounting seal 72 between the cap, bearing and shaft, the seal 72 of the present invention is preloaded and does not require external spring elements for loading as do the general face seals of the prior art. It is this preloading that boosts the seal's pressure capacity and results in the achieved benefits for the gearbox of the present invention.

With reference to FIG. 5 and turning more particularly to seal 72, it is formed of a compressed and sintered silicon carbide and is comprised of a cap element 78 and a bearing element 80. Cap element 78 includes a cup portion 82 and a face portion 84 wherein cup portion 82 mounts within a journal 86 bored into cap 46, 68. Bearing element 80 includes a boot portion 88 and a face portion 90, wherein bearing element 80 is mounted around shaft 36 and said boot portion 88 is compressed against the adjacent bearing. As seen in FIGS. 3 and 4, when mounted in this fashion, the face portion 84 of cap element 78 and the face portion 90 of bearing element 80 are urged into sealing contact with one another at a seal interface.

The above described system will inhibit vegetation or other debris from damaging gearbox and gear motor seals or compromising the drive train of various agricultural and industrial equipment. Furthermore, the system assures internal pressure of the gear drive of such equipment. While standard prior art seals will generally only hold internal gearbox pressures of 10–15 psi, internal gearbox pressures in excess of 60 psi have been experienced in irrigation drive line gearboxes of the present invention. Those skilled in the art will understand that although the protection system has been specifically described for use with center pivot irrigation systems, the protection system is also suitable for other equipment.

While certain features and embodiments of the invention have been described in detail herein, it will be readily understood that the invention encompasses all modifications and enhancements within the scope and spirit of the following claims.

What is claimed is:

1. An irrigation drive line gearbox comprising:
   a. a irrigation drive line gearbox housing having an output shaft aperture and an input shaft aperture;
   b. a power input shaft rotatingly mounted within said gearbox and extending through said input shaft aperture;
   c. a poser output shaft rotatingly mounted within said gearbox and extending through said output shaft aperture;
   d. at least one bearing mounted within said housing adjacent one of said apertures and rotatingly supporting one of said shafts;
   e. a face seal disposed within said housing, wherein said face seal is disposed along the shaft and is compressed between the bearing and the housing adjacent the shaft aperture.

2. The irrigation drive line gearbox of claim 1, wherein said gearbox housing defines a cap adjacent the face seal and said face seal is compressed between said bearing and said cap.

3. The irrigation drive line gearbox of claim 2, wherein said face seal comprises a first element and a second element, wherein said first element is mounted in said cap and said second element is mounted on said shaft against said bearing.

4. The irrigation drive line gearbox of claim 3, wherein said first element is defined by a cap end and a face end and said second element is defined by a boot end and a face end, and wherein the cap end of the first element seats within said cap and the boot end of the second element seats against said bearing and the face elements are urged against one another to form a sealing interface.

5. The irrigation drive line gearbox of claim 3, wherein at least one of said elements is formed of ceramic-carbide.

6. The irrigation drive line gearbox of claim 3, wherein at least one of said elements is formed of compressed and sintered silicon and carbide.

7. The irrigation drive line gearbox of claim 3, wherein at least one of said elements is formed of compressed and sintered carbide.

8. An irrigation drive line gearbox comprising:
   a. a irrigation drive line gearbox housing forming an output cap with an output shaft aperture therein and an input cap with an input shaft aperture therein;
   b. a power input shaft rotatingly mounted within said gearbox and extending through said input shaft aperture;
   c. a power output shaft rotatingly mounted within said gearbox and extending through said output shaft aperture;
   d. an output bearing mounted within said housing adjacent said output cap and rotatingly supporting said output shaft;
   e. an input bearing mounted within said housing adjacent said input cap and rotatingly supporting said input shaft;
   f. a silicon carbide output face seal disposed within said housing, wherein said output face seal is disposed along the output shaft and is compressed between the output bearing and the output cap;
   g. a silicon carbide input face seal disposed within said housing, wherein said input face seal is disposed along the input shaft and is compressed between the input bearing and the input cap;
   h. wherein each of said face seals comprises a first element and a second element, said first element defined by a cap end and a face end, said second element defined by a boot end and a face end, wherein the cap end of the first element seats within said cap and the boot end of the second element seats against said bearing and the face elements are urged against one another to form a sealing interface.

* * * * *

UNITED STATES PATENT AND TRADEMARK OFFICE
CERTIFICATE OF CORRECTION

PATENT NO. : 6,820,822 B2
DATED : November 23, 2004
INVENTOR(S) : Jeffrey Daniel It is certified that error appears in the above-identified patent and that said Letters Patent is hereby corrected as shown below:

Title page,
Item [12], United States Patent, the inventor's name which reads "Daniels" should read -- Daniel --.
Item [75], Inventor, "Jeffrey Daniels" should read -- Jeffrey Daniel --.

Signed and Sealed this

Twenty-second Day of February, 2005

JON W. DUDAS
*Director of the United States Patent and Trademark Office*